United States Patent [19]

Corrigan

[11] 3,909,299
[45] Sept. 30, 1975

[54] FUEL CELL SYSTEM INCLUDING REFORM REACTOR

[75] Inventor: Thomas J. Corrigan, Coventry, Conn.

[73] Assignee: United Technologies Corporation, Hartford, Conn.

[22] Filed: Oct. 1, 1973

[21] Appl. No.: 402,226

[52] U.S. Cl. ............ 136/86 C; 23/288 K; 23/288 L; 48/94; 48/105; 48/196 R
[51] Int. Cl.² ...................... H01M 27/12; B01J 7/00
[58] Field of Search ..... 136/86 C; 23/288 K, 288 L, 23/288 M; 48/94, 105, 196 R

[56] References Cited
UNITED STATES PATENTS

| | | | |
|---|---|---|---|
| 1,604,739 | 10/1926 | Downs | 23/288 M |
| 2,450,804 | 10/1948 | Loy | 23/288 L |
| 2,700,598 | 1/1955 | Odell | 48/196 R |
| 3,141,796 | 7/1964 | Fay et al. | 136/86 C |
| 3,144,312 | 8/1964 | Mertens | 48/196 R X |
| 3,522,019 | 7/1970 | Buswell et al. | 48/94 X |
| 3,531,263 | 9/1970 | Sederquist | 48/196 R X |
| 3,541,729 | 11/1970 | Dantowitz | 48/94 |
| 3,698,957 | 10/1972 | Sanderson | 136/86 C |
| 3,762,465 | 10/1973 | Gutlhuber | 23/288 M UX |

FOREIGN PATENTS OR APPLICATIONS

| | | | |
|---|---|---|---|
| 660,540 | 11/1951 | United Kingdom | 23/288 K |

*Primary Examiner*—A. B. Curtis
*Attorney, Agent, or Firm*—Melvin P. Williams; Stephen E. Revis

[57] ABSTRACT

A vessel containing a catalytic bed for an endothermic reaction for processing hydrocarbon fuel in a fuel cell, such as a hydrocarbon/steam reform reaction, is coaxially disposed inside a vessel containing a catalytic bed for the exothermic water/gas shift conversion reaction. Start up heat required to bring the shift converter catalytic bed up to operating temperature is provided by the primary heat supply of the endothermic reaction, such as an adjacent hydrogen burner or a flow of hot exhaust from a remote burner, thereby eliminating the need for shift converter start up heaters. In one embodiment, burner air flows between the primary heat and the shift converter bed during normal running operation, the flow of burner air being bypassed for an improved heat transfer to the shift converter bed during start-up.

2 Claims, 1 Drawing Figure

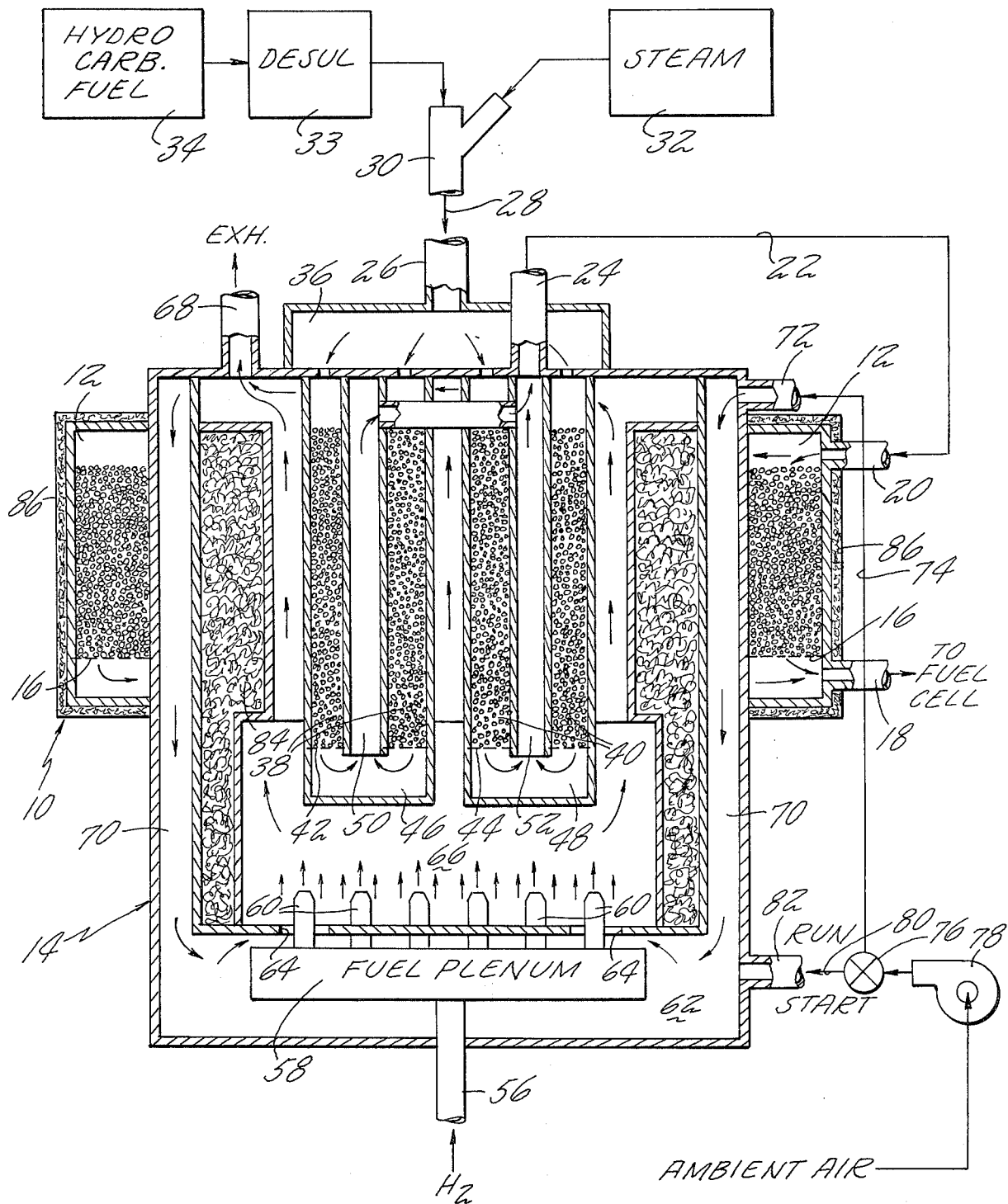

FUEL CELL SYSTEM INCLUDING REFORM REACTOR

BACKGROUND OF THE INVENTION

1. Field of Invention

This invention relates to hydrocarbon fuel processing, and more particularly to selfstarting shift converter apparatus combined with other, endothermic reaction apparatus.

2. Description of the Prior Art

The generation of electricity by means of fuel cells, which react hydrogen and oxygen so as to form electricity, together with by-products such as heat and water, has long been known.

As is known, the practical application of the fuel cell process for generation of electricity requires a relatively reliable, abundant and low cost source of hydrogen. Typically, hydrogen has been derived within the fuel cell power plant itself by the reformation of hydrocarbon fuels to hydrogen and other by-products in a hydrocarbon steam reformer. Frequently the hydrocarbon fuels utilized for fuel cell power plants contain significant amounts of sulfur, and the sulfur has to be reduced significantly prior to further processing of the hydrocarbon fuel to form hydrogen. This is typically achieved by passing the hydrocarbon fuel through a hydrodesulfurization catalyst, and promoting an endothermic desulfurizing reaction by supplying a moderate amount of heat to the catalyst bed. Reformers of the type typically utilized in fuel cell power plants have consisted of vessels of steam reforming catalysts heated by a burner stream which produces a high temperature gas mix including hydrogen, carbon dioxide, carbon monoxide, and some hydrocarbon fuel and water, together with trace amounts of other hydrocarbons. This effluent is typically passed through a regenerative heat exchanger in order to return some of the heat of the high temperature gas to the endothermic reforming reaction, and is thereafter passed through a shift converter containing a shift conversion catalyst which causes an exothermic reaction of carbon monoxide and water (steam) to form carbon dioxide and additional hydrogen. This step is necessary since the presence of carbon monoxide in the hydrogen fuel stream of a fuel cell poisons the catalyst on the anode of the fuel cell, and therefore the carbon monoxide level in the fuel stream must be reduced to on the order of one or two percent. Of course, the generation of further hydrogen from the combination of $CO$ and $H_2O$ is an additional advantage. The system is entirely powered by the hydrocarbon fuel fed to it. The heat for the endothermic reforming reaction is supplied by a burner which in turn burns hydrogen effluent of the fuel cell itself.

Even though the shift conversion process is exothermic in nature, and thereby generates heat, the reaction takes place only within suitable temperature ranges, such as between 200° and 600°F; when the apparatus is initially started, the catalyst is at an insufficient temperature to promote the steam/gas shift conversion reaction. Therefore, fuel cell power plants which process hydrocarbon fuel have typically been provided with start-up heaters for warming the shift converter catalyst up to a starting temperature. Otherwise, the use of the warm effluent from the steam reform reactor as a means of providing start-up heat to the shift converter catalyst requires several hours in a typical case, which usually is intolerable.

Because all of these reactions are thermal in nature (either exothermic or endothermic), they require heat exchanging and inherently include plumbing heat losses. The overall fuel cell power plant function, including reforming, is only on the order of 30–40 percent efficient (as in the case of conventional steam generators).

In the case of the shift converter, since the reaction therein is exothermic, it is possible to utilize some of the heat therefrom to supply heat to the endothermic reactions (either desulfurization or shift converting). Typically this is done by passing the fuel outlet of the shift converter through the heat exchanger to heat air which is used in the burner which supplies primary heat to the reaction (either desulfurization or reform reaction). However, this method is not too efficient. On the other hand, it is necessary to insure that if the magnitude of reaction becomes very high, so that there is a large buildup of heat in the shift converter, then this heat can be dissipated to ambient, if not through other means, thereby to insure that the shift converter catalyst does not go above a certain temperature at which its reactivity is impaired (on the order of 700°F). Thus, if the shift converter is totally jacketed so as to directly convey heat to another fluid flow, the flow of such fluid must be sufficient to insure that, at any rate of reaction, the shift converter will not overheat; otherwise, it is necessary to provide for some amount of heat exchange with ambient in order to assure a measure of safety in the operation of the device.

Recently, the adaptation of fuel cells from exotic uses (such as generating power for spaceships) to more practical usage (such as in production of commercial and domestic electricity), has received wide attention. Because the practicality of a fuel cell electric power plant is measured simply against the relative cost versus the availability of other sources of electricity, it is necessary to render the cost of equipment as low as possible and the efficiency of the process as high as possible.

SUMMARY OF THE INVENTION

The object of this invention is to improve the efficiency of generating electricity from hydrocarbon fuel (including steam reforming and shift converting), and to mitigate the size, weight and cost of fuel cell power plants.

According to the present invention, an exothermic shift converter is combined with an endothermic catalytic reaction apparatus, such as a steam reform reactor, in a manner that a portion of the primary heat supplied to the endothermic reaction apparatus heats the shift converter catalyst to reaction temperature, and when running in steady state, at least a portion of the heat generated by the exothermic shift conversion reaction is coupled into the endothermic reaction apparatus.

The present invention eliminates the need for a startup heater for a shift converter in a fuel cell power plant. The invention also provides for apparatus which is lower in cost, size and weight than apparatus heretofore known to the art. The invention promotes efficiency of the overall electricity generation process by improving the efficiency of heat transfers in the processing of hydrocarbon fuels in a fuel cell power plant.

Other objects, features and advantages of the present invention will become more apparent in the light of the following detailed description of preferred embodiments thereof, as illustrated in the accompanying drawing.

BRIEF DESCRIPTION OF THE DRAWING

The sole FIGURE herein is a partially schematized, simplified, sectioned side elevation view of one embodiment of the present invention.

DESCRIPTION OF THE PREFERRED EMBODIMENT

Referring now to the drawing, one embodiment of a self-starting shift converter in accordance with the present invention comprises a shift converter vessel 10 which forms an annular chamber 12 contiguously surrounding a generally cylindrical hydrocarbon steam reform reactor apparatus 14. The chamber 12 includes an annular screen or grid 16 above which is disposed a bed of a suitable water/gas shift reaction catalyst, such as that sold under the trade name G-66 by the Girdler Catalyst Company, Louisville, Kentucky. The shift converter 10 is provided with an outlet 18 which is connected to the hydrogen inlet of the fuel cell proper. The shift converter 10 is provided with an inlet 20 which is connected by a suitable duct 22 to an outlet 24 of the reform reactor apparatus 14, which in turn has an inlet 26 connected by a suitable duct 28 to an ejector or other suitable mixer 30 which mixes steam from a source 32 with hydrocarbon fuel from a desulfurizer 33 that removes substantial amounts of sulfur from fuel provided by a source of hydrocarbon fuel 34. The inlet 26 connects through a plenum 36 to a plurality of chambers 38, 40, each of which contains a reform catalyst such as that sold by Girdler under the trade designation G-56, which causes the reaction of the stream of hydrocarbon fuel (which may be methane, butane, or other fuel) with steam to form a gas mixture of hydrogen, carbon dioxide, carbon monoxide, small amounts of hydrocarbon fuel, and water, together with traces of other hydrocarbons. For example, the reaction for methane is:

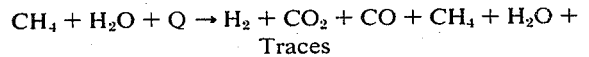

$$CH_4 + H_2O + Q \rightarrow H_2 + CO_2 + CO + CH_4 + H_2O + \text{Traces} \quad (1)$$

where +Q designates the fact that the reaction will occur only by the application of energy at a suitable temperature, on the order of 1400° – 1600°F.

At the bottom of each vessel 38, 40 is a screen or grid 42, 44, which contains the catalyst thereabove, thereby providing related plenums 46, 48 through which the shift converted gas stream may flow into heat exchangers 50, 52, which allows the temperature of the gas stream to be reduced from on the order of 1200° to approximately 600°F at the outlet 24. The reaction is promoted by heat from a burner which includes a hydrogen inlet 56, a fuel plenum 58 which directs the hydrogen to a plurality of nozzles 60, and an air plenum 62 having passages 64 to permit flow of air into a combustion chamber 66 which completely surrounds the reform reactor chambers 38, 40 and provides hot exhaust gases to an exhaust outlet 68 for use in any suitable heat exchanger. Air reaches the plenum 62 by means of an annular duct 70 to which air is fed through an inlet 72 over a conduit 74 from a valve 76 which is in turn connected to a blower 78 which delivers ambient air. The valve 76 is normally connected to the conduit 74 during normal operation, but may be transferred so as to connect to a duct 80 which supplies air directly to the plenum 62 via an inlet 82 during start-up of the apparatus. As the air passes downwardly through the annular duct 70, it is heated by heat generated in the chamber 12 as a result of the exothermic water/gas shift conversion reaction:

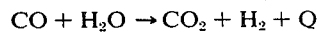

$$CO + H_2O \rightarrow CO_2 + H_2 + Q \quad (2)$$

The heat (Q) given off by the water/gas shift reaction is on the order of 17,000 BTU's per mol of carbon monoxide reacted. This reaction may occur on the order of 450° – 650°F.

In the embodiment herein, the annular air duct 70 provides the primary means of cooling the shift converter 10. It is given partial thermal isolation from the very high temperatures within the reform reactor combustion chamber 66 by means of a small measure of insulation in an annular chamber 84. The shift converter 10, however, having a large surface area which is capable of transferring heat therefrom into the ambient, is not dependent upon heat removal by the burner air in the annular duct 70. By providing a small measure of insulation 86 (which may comprise on the order of one-fourth inch thickness of insulation sold under the trade designation Fiber Frax by Carborundum Corp., Niagara Falls, New York, the loss of heat to ambient is minimized while at the same time the ability of the shift converter 10 to avoid overheating during high reaction rates are both made possible.

In normal operation (sufficiently after start-up so that a certain measure of stabilization has occurred), ambient air entering the inlet 72 may be on the order of 70° – 110°F (depending on the ambient), and this is typically heated (by heat from the shift converter 10) to about 300°F as it enters the air plenum 62. This improves the efficiency of the burner, and thereby also of the overall electric generation process. The burner flame may typically be on the order of 2700°F, which may cause the low ends of the reform reactors 38, 40 to each be on the order of 1600°F. The fuel/steam mixture entering the top of the catalyst beds in the reform reactors 38, 40 may be on the order of 500°F, and may reach approximately 1450°F at the bottom of the catalyst beds. This is cooled (by giving off heat back to the reform reactors 38, 40) to approximately 700°F at the outlet 24, and is further cooled in the conduit 22 (which may possibly include a heat exchanger for the efficient usage of more heat energy) to about 500°F as it enters the shift converter 10. Although the shift conversion reaction generates heat, a fair amount of this heat is given off to the burner inlet air in the conduit 70 so that the main fuel stream, as it passes out of the shift converter 10 through the outlet 18, may be at on the order of 550°F. This is one aspect of the present invention: the exothermic shift conversion reaction supplies heat to burner inlet air to improve the efficiency of the endothermic steam reforming action.

In accordance with an important aspect of the present invention, the valve 76 may be operated into a start position so as to supply ambient air from the pump 70 through an inlet 82 directly into the air plenum 62 of the burner so that no air flows through the conduit 70 during start up. Since the air in the conduit 70 is substantially stagnant, a substantial flow of heat through it and the insulation 84 can take place thereby applying burner heat directly into the catalyst beds of the shift converter 10 so as to bring the shift conversion catalyst up to a suitable operating temperature (such as between 200° and 600°F) as will promote the steam/gas shift conversion reaction. This allows the operation of the combined reform reaction/shift conversion apparatus from start-up, without the need of an external heater to achieve operating temperature of the shift converter. Another aspect of the present invention is that, as configured in the embodiment shown herein, even though a certain amount of insulation 84, 86 is utilized, this is to achieve a balanced operation, without an undue amount of heat being lost to ambient, while at the same time permitting heat transfer from one chamber to another so as to achieve the return of heat from the exothermic shift conversion reaction into the endothermic reform reaction in combination with provision of start-up heat directly from the reform reaction burner, thereby eliminating need for a start-up heater to achieve operating temperature in the shift converter. The present invention is disclosed herein as implemented in a combination steam reform reactor/self-starting shift converter for a fuel cell power plant. However, the principals of the invention may be practiced equally well in other combinations, such as a hydrodesulfurization catalytic reaction apparatus surrounded by a self-starting shift converter apparatus, where the reform reactor is located remotely from the combination. In such case, the heat utilized for start-up of the hydrodesulfurization process also raises the shift converter catalyst to start-up temperature. Similarly, although a burner is shown in the present embodiment, the heat utilized for start-up of the shift converter may instead be supplied by a flow of hot air from a remotely located burner, particularly in the case where a remotely located burner is to be preferred for the endothermic reaction, as may well be the case if the invention is practiced utilizing the combination of a hydrodesulfurizer with a self-starting shift converter.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by letters Patent of the United States is:

1. In a fuel cell power plant, a steam reform reactor/self-starting shift converter combination, comprising:

a reform reactor comprising a burner and a plurality of chambers, a first of said chambers being a reform reactor chamber having an inlet for receiving hydrocarbon fuel and containing steam reform reaction catalyst for converting the hydrocarbon fuel to hydrogen and other products and having an outlet, first duct means surrounding a substantial portion of said reform reactor chamber and in heat exchange relationship therewith, a second of said chambers containing said burner and providing for the flow of hot gases into said first duct means around said reform reactor chamber, said burner including an air plenum with a direct air inlet;

second duct means surrounding in heat exchange relationship a substantial portion of said first duct means and having an air inlet for receiving burner air and an air outlet opening into said air plenum of said burner;

a shift conversion chamber surrounding in heat exchange relationship substantial portions of said second duct means and said reform reactor and having an inlet for receiving the product of said reform reactor and an outlet for supplying processed hydrocarbon fuel including hydrogen to said fuel cell power plant; and a source of ambient burner air including a valve and a pair of conduits, the first conduit of said pair connected to said air inlet of said second duct means and the second conduit of said pair connected to said direct air inlet of said burner air plenum, said valve being adapted to supply burner air to said second conduit during start-up and to said first conduit during running after start-up.

2. The combination according to claim 1 further comprising:

a thin layer of insulation surrounding a substantial portion of said shift conversion chamber.

* * * * *